(12) United States Patent
Morcom

(10) Patent No.: US 6,753,950 B2
(45) Date of Patent: Jun. 22, 2004

(54) OPTICAL DISTANCE MEASUREMENT

(75) Inventor: John Morcom, Kent (GB)

(73) Assignee: Instro Precision Limited, Kent (GB)

( * ) Notice: Subject to any disclaimer, the term of this patent is extended or adjusted under 35 U.S.C. 154(b) by 0 days.

(21) Appl. No.: 10/182,458

(22) PCT Filed: Dec. 21, 2000

(86) PCT No.: PCT/GB00/04968
§ 371 (c)(1),
(2), (4) Date: Oct. 21, 2002

(87) PCT Pub. No.: WO01/55746
PCT Pub. Date: Aug. 2, 2001

(65) Prior Publication Data
US 2003/0048430 A1 Mar. 13, 2003

(30) Foreign Application Priority Data
Jan. 26, 2000 (GB) ............................................. 0001803
Mar. 6, 2000 (GB) ............................................. 0005347

(51) Int. Cl.[7] ............................ G01C 3/08; G01S 13/08
(52) U.S. Cl. ..................... 356/4.01; 342/145; 356/5.01; 356/5.1
(58) Field of Search .............................. 356/4.01, 5.15; 342/145

(56) References Cited

U.S. PATENT DOCUMENTS

| | | | | |
|---|---|---|---|---|
| 4,518,256 A | * | 5/1985 | Schwartz | |
| 4,569,599 A | * | 2/1986 | Bolkow et al. | |
| 4,615,617 A | * | 10/1986 | Frank et al. | |
| 4,620,788 A | * | 11/1986 | Giger | |
| 5,805,468 A | * | 9/1998 | Blohbaum | |

FOREIGN PATENT DOCUMENTS

| | | | | |
|---|---|---|---|---|
| DE | 19949803 A1 | * | 4/2000 | |
| GB | 1585054 | * | 2/1981 | |

* cited by examiner

Primary Examiner—Stephen C. Buczinski
(74) Attorney, Agent, or Firm—Blakely, Sokoloff, Taylor & Zafman

(57) ABSTRACT

Optical distance equipment transmits an optical signal and determines distance by locating the peak of a correlation with the reflected signal. The number of calculations required for the correlation is greatly reduced by using a combination of a coarse and fine correlation. The accuracy of the distance measurement is also improved by calculating the point of intersection of two best fit lines to either side of the correlation peak. The signal is preferably modulated by a maximum length sequence.

21 Claims, 4 Drawing Sheets

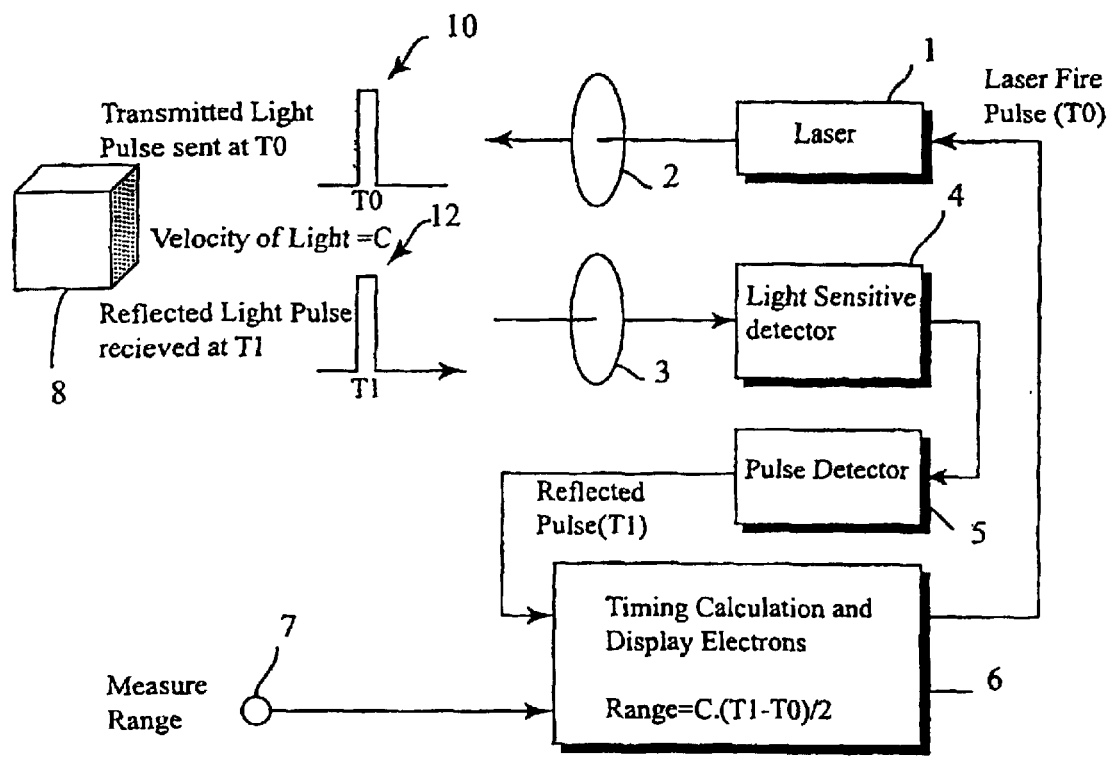
Fig.1
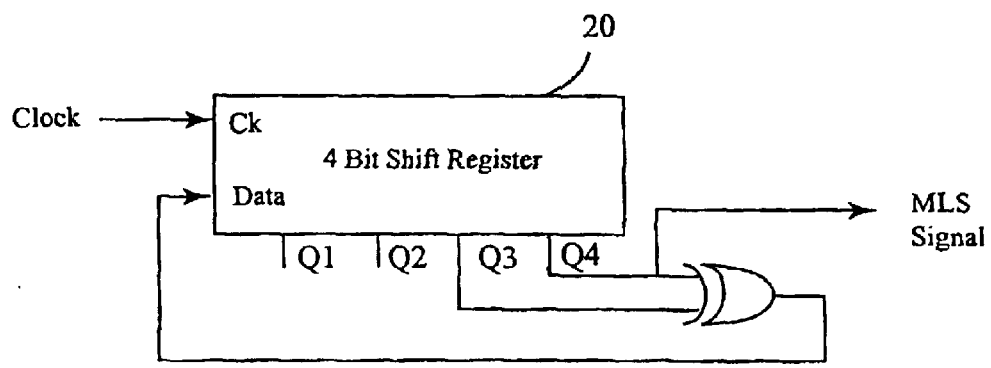
Fig.2
Example MLS Signal
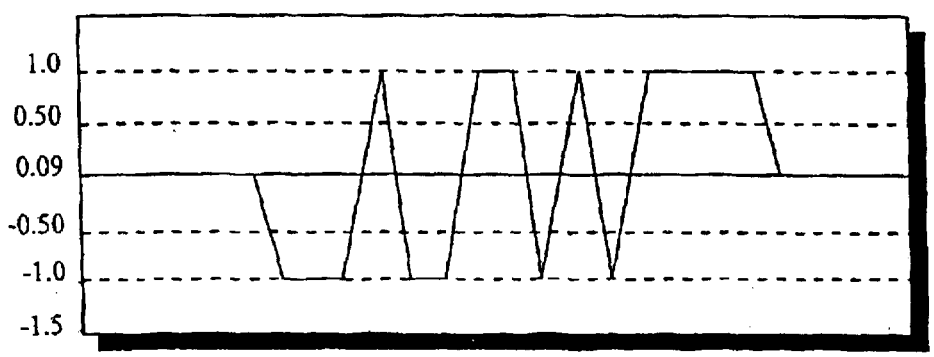

US 6,753,950 B2

OPTICAL DISTANCE MEASUREMENT

This is a non-provisional application claiming the benefit of International application number PCT/GB00/04968 filed Dec. 21, 2000.

FIELD OF THE INVENTION

This invention relates to distance measurement, particularly an optical distance measurement system.

BACKGROUND OF THE INVENTION

One common approach to measuring distance to a far object is to measure the time of flight of a pulse of light from the measuring system to the far object and back again, and then to calculate the distance to the far object based upon the speed of light. Systems employing this method commonly employ a laser to generate the light pulse and so are known generically as "laser range finders" (LRF's) or "light detection and ranging" (LiDAR) systems. Typical applications are the measurement of altitude, target range or distance for survey applications in civil engineering and metrology. LRF's may be built as stand alone hand held units or embodied in larger systems.

A known LRF is shown in FIG. 1 and comprises a laser 1, an optical transmission system 2, an optical reception system 3, a light sensitive detector 4, pulse detection circuitry 5, and timing calculation and display electronics 6.

In operation, the user initiates a measurement of range using input 7, which causes a laser fire pulse to be sent to the laser 1 and the laser to emit a pulse of light at time T0 as represented by the plot 10. This pulse is focussed by the transmission optics 2 and travels to the remote object 8 where it is reflected. The receiving optics 3 collects a portion of the reflected light pulse illustrated as plot 12 and focuses the energy onto the light sensitive detector 4. The detector 4 converts the received light pulse into an electrical signal and the pulse detector 5 discriminates against any electrical noise generated by the light sensitive detector to provide a clean, logic level pulse from the incoming light detector signal at time T1.

This pulse is passed to timing calculation and display electronics 6 which calculates and displays the range to the remote object based upon the time of flight of the laser pulse (T1–T0) and the speed of light (c) in the intervening medium.

Often there are multiple pulses apparent within the reflected signal captured by the detector 4 due to reflections from a number of different objects (e.g. vegetation) in the path of the light pulse or variations in the refractive index of the intervening atmosphere. LiDAR systems, instead of using a simple pulse discrimination system 5, apply further signal processing and analysis to the signal output by detector 4 to calculate the position and strength of these additional reflections and hence enable various characteristics of the intervening objects or atmosphere to be studied.

To reduce cost, some LRF devices employ a single optical system with an optical beam splitter to separate the transmitted and reflected pulses.

The maximum range that can be measured by an LRF or LiDAR system is determined by the point at which the LRF can no longer discriminate between the incoming reflected pulse and any background illumination or effects inherent in the optical detector such as e.g. thermally generated dark current and shot noise.

Because of the losses in transmission and reflection, to achieve ranges of more than a few kilometers requires laser technologies such as Nd:YAG or Erbium:Glass which are relatively expensive. Lower cost systems have been built using solid state laser diodes but because the energy in each transmitted pulse is relatively low their range is limited to a few hundred meters.

Some systems extend the range by sending many (N=hundreds or thousands) pulses and summing the reflected signals to improve discrimination against the uncorrelated detector noise. Using this technique an LRF using solid state laser diodes can achieve a range of up to 2–4 Km. However, this process only provides a √N improvement in discrimination at best. In addition, because a pulse cannot be transmitted until the reflection of the previous pulse has been detected to avoid ambiguity, at long ranges the pulse repetition rate is limited. For example to send and receive a pulse to a remote object at 5 Km takes ~30 $\mu$S and so to collect 1000 samples takes 0.03 S. In practice, it is found that over this time period slight movements in the line of sight or the remote object can substantially reduce the advantages of summing the received pulses.

There is also a trade off between the range and the light transmitting and light gathering capabilities of the optical systems used. Wide aperture optical systems will improve range but increase size and cost.

To overcome the disadvantages of these systems, alternative approaches have been developed.

One example is the system described in GB 1 585 054. In this system the output of a Carbon dioxide laser is passed through an acousto-optical modulator and output. Received infra-red signals are detected, and an electronic circuit using surface acoustic wave devices is provided that can determine the range and velocity of a target.

One particularly effective embodiment of the technique can be achieved using a signal known as the Maximal Length Sequence (MLS). This is a family of pseudo random noise binary signal (PRBS) which are typically generated using a digital shift register whose input is generated from appropriate feedback taps. The use of such a sequence is described in GB 1 585 054.

The maximal length sequence is the pseudo random noise sequence with the longest period which can be generated with a shift register of r sections. It has a length $N=2^r-1$ shift register clock cycles and has good auto-correlation properties as the auto-correlation function has only two values; either $-1/N$ or a peak of 1.0 at the point of correlation.

FIG. 2 illustrates one example of a maximal length sequence generated by a four stage shift register 20. Alternative length sequences can be generated by using longer shift registers with the appropriate feedback taps.

This approach may also be combined with averaging techniques to improve the signal to noise ratio and hence range further.

Another document describing a similar approach is DE 199 48 803 which describes a rangefinder. A maximum length sequence (MLS) is transmitted and correlated with a received reflected signal. The MLS is a good choice because its binary nature allows efficient modulation of laser diodes. In addition, because the signal only takes values of +1 and –1, the cross-correlation can be computed simply only additions and subtractions, without the need for multiplications.

A further difficulty is that the distance precision is limited by the sample rate of the analogue to digital converter. For example, if the sample rate is 33 MHz, then the smallest time increment which can be measured is ~30 nS which equates to a distance precision of ~5 m. This is insufficient for many applications. To overcome this problem, the sample rate can be increased, but this increases system cost because more expensive components and more sophisticated circuitry are needed.

In the apparatus of DE 19948803 a controllable delay line is provided between the transmitted signal and the cross correlator; the length of the delay introduced by the delay line is controlled by the timing electronics. In operation, successive MLS signals are transmitted and the delay line is adjusted in small steps until the correlation peak is maximised. The total time of flight is calculated from the whole number of MLS clock cycles plus the small delay added by the delay line at which the correlation peak is maximised. In DE 199 49 803 the delay step size is set equal to one fifth of the MLS clock sample frequency and so the precision of the time and distance measurement is increased by a factor of five. A major disadvantage of this technique is that the total measurement time is increased by the number of steps required to find the correlation peak. This is problematic in many applications:

a) in low power, hand held applications transmitting more MLS signals wastes power, reducing battery life;

b) in covert applications, increasing the number of MLS cycles transmitted increases the probability of detection; and c) in real time measurement applications increasing the number of MLS cycles reduces the number of distance measurements which can be made in a given time.

A further point is that in order to fully calculate a cross correlation coefficient a significant level of computation would be required. For example, an MLS signal of order 10 comprises 1023 clock cycles so to fully calculate the cross-correlation of the modulation and received signals would require $1023^2$ or 1046529 operations.

To overcome this difficulty, the design described in DE 199 49 803 uses a comparator to convert the received signal into a single bit signal. This enables the cross-correlation function to be computed using an exclusive OR gate and shift register combination. Whilst this simplifies the cross-correlation calculation the substantial loss of signal information incurred with the one bit digitisation much reduces the effectiveness of the technique, particularly where the reflected signal amplitude is equal to or less than the noise from the detector and the ambient.

The proposed invention seeks to overcome these problems.

SUMMARY OF INVENTION

According to the invention there is provided an optical distance measuring equipment comprising a signal source for supplying a modulation signal, a transmission system connected to the signal source for transmitting a transmitted optical signal modulated by the modulation signal, a reception system for receiving a received optical signal which is a reflected and delayed version of the transmitted signal, and a cross-correlator arranged to carry out the steps of
determining, at a coarse resolution, the time delay of the modulation signal needed to maximise the correlation between the time delayed modulation signal and the received signal, determining at a finer resolution than the coarse resolution, the correlation between the modulation signal and the received signal as a function of the time delay of the modulation signal with respect to the received signal in a time delay range around the determined time delay, and outputting a measure of distance calculated from the time delay of the modulation signal needed to maximise the correlation between the time delayed modulation signal and the received signal.

As will be explained in more detail below, the determination of a coarse value of the time delay and the use of the coarse value to calculate more accurately the time delay can greatly reduce the number of calculations that are required.

Furthermore, good accuracy can be obtained without the need to transmit repeated MLS signals.

The output measure can be the distance itself, in duly convenient units, or alternatively a measure of distance such as the calculated time delay, or any other measure such as area or volume including or based on the distance.

The simplified calculation permits the use of a multiple bit analogue to digital converter for digitising the received signal and outputting a multiple bit output for each clock cycle of the analogue to digital converter. In DE 199 49 803 on the other hand the signal is digitised using a comparator, effectively a one bit digital to analogue converter. It would be very difficult in the arrangement of DE 199 49 803 to calculate cross-correlations using multiple bit precisions, since the number of calculations used would be very high. The use of the coarse and fine correlation calculations in the present invention reduces the calculation load and accordingly permits the use of a higher resolution representation of the received signal.

Indeed, somewhat surprisingly, the time delay output may be determined on a resolution that is even finer than the time resolution used in either of the coarse and fine determinations. This may be done by providing means for calculating the parameters of a straight line fit to the correlation output by the fine cross-correlator as a function of time delay in the time shift intervals before the peak time shift, for calculating the parameters of a straight line fit to the correlation output by the fine cross-correlator as a function of time delay in the time shift intervals after the peak time shift, and for calculating the peak time shift from the fitted parameters of straight line fits.

In embodiments, the optical distance measuring equipment may comprise a coarse cross-correlator for coarsely determining the time delay of the modulation signal needed to maximise the correlation between the time delayed modulation signal and the received signal, and a fine cross-correlator for calculating the correlation between the modulation signal and the received signal as a function of the time delay of the modulation signal with respect to the received signal in a time delay range around the time shift determined by the coarse cross-correlator.

Alternatively, the coarse and fine calculations can be carried out in a single digital signal processor and code programming the processor to carry out the coarse and fine time delay determinations sequentially.

The coarse cross correlator may be clocked at a first frequency determining the coarse resolution and the fine cross-correlator may be clocked at a higher second frequency.

Because the coarse cross-correlation can be computed quickly, the coarse correlation can be periodically calculated on the signal stored in the averaging memory (52). When the coarse correlation shows that an adequate signal to noise ratio has been achieved the fine correlation can be performed to give a final, accurate distance result. In this way, the laser energy needed to measure any particular distance is always kept to a minimum which is of benefit in battery powered applications and maximises eye safety in any application.

The signal source may be clocked at a sub-multiple of the second clock frequency different to the first clock frequency.

This can improve the detection of the coarse time delay when the signal to noise ratio is poor. Indeed, the first, second and signal source clock frequencies may be adjustable for allowing adaptive optimisation of performance for different applications.

The signal source may produce a digital modulation signal clocked at a frequency lower than that of a clock input to the cross-correlator. The digital modulation signal may be a maximum length sequence. Such sequences give a useful, known cross-correlation function with a triangular peak. The analogue to digital converter may be clocked at the higher second frequency used for the fine determination of the time delay.

In another aspect, the invention relates to a method of optically measuring distance including supplying a modulation signal, transmitting a transmitted optical signal modulated by the modulation signal, receiving a received optical signal which is a reflected and delayed version of the transmitted signal, coarsely determining the time delay of the modulation signal needed to maximise the correlation between the time-delayed modulation signal and the received signal, and calculating at a finer resolution the correlation between the modulation signal and the received signal as a function of the time delay of the modulation signal with respect to the received signal in a time delay range around the time shift determined by the coarse cross-correlator to give a measure of distance.

The step of coarsely determining the time delay may be carried out at a first clock frequency and the step of calculating the correlation at a second higher clock frequency.

The signal source may be clocked at a sub-multiple of the second clock frequency different to the first clock frequency. The signal source may produce a digital modulation signal clocked at the first frequency. The digital modulation signal may be a maximum length sequence.

The received signal may be digitised at a multiple bit resolution.

The analogue to digital converter may be clocked at the higher second frequency.

To enhance accuracy, the method may further comprise calculating the parameters of a straight line fit to the correlation output by the fine cross-correlator as a function of time delay in the time shift intervals before the peak time shift, calculating the parameters of a straight line fit to the correlation output by the fine cross-correlator as a function of time delay in the time shift intervals after the peak time shift, and calculating the peak time shift from the fitted parameters of straight line fits.

The input on the coarse cross-correlator may be filtered through a low-pass filter.

BRIEF DESCRIPTION OF THE DRAWINGS

An example of the invention will now be described in detail with reference to the accompanying drawings, in which:

FIG. 1 shows a known laser range finding apparatus;

FIG. 2 shows circuitry for generating a maximal length sequence;

DETAILED DESCRIPTION OF THE INVENTION

Figure 3:
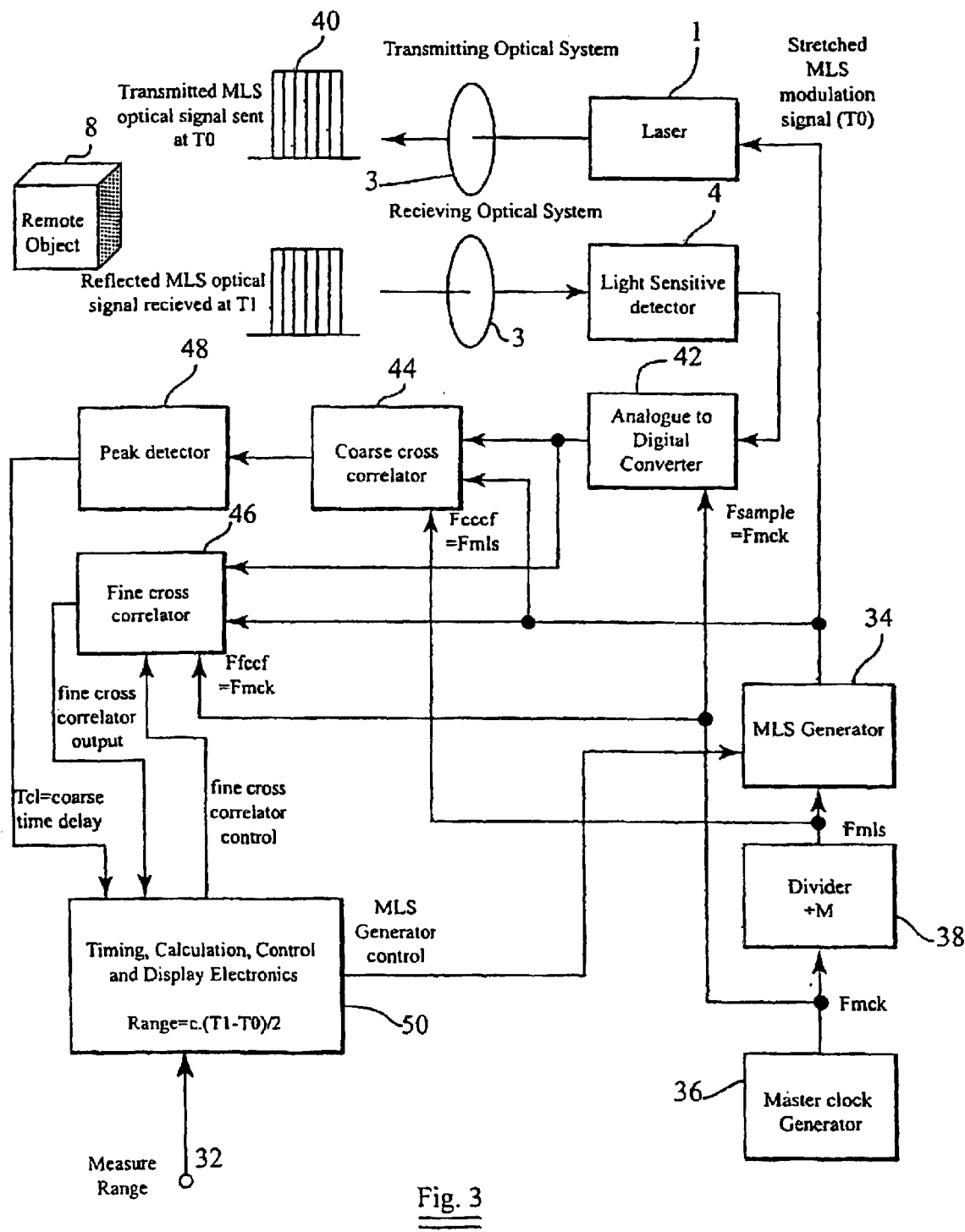
FIG. 3 shows a schematic diagram optical distance measuring equipment using a time delay measurement technique based on a first embodiment of the invention.

One example of how optical distance measurement equipment based on the MLS technique can be improved by using the invention is illustrated in FIG. 3.

In operation, the user initiates a measurement of range at input 32 which causes an MLS generator 34 to generate an MLS signal. The MLS generator clock signal is derived from the system master clock Fmck 36 by divider 38 so that the MLS clock frequency Fmls is a known sub-multiple M of the master clock signal. In effect, the MLS is stretched in time by factor M. The "stretched" MLS signal causes the laser 1 to emit an optical stretched MLS signal starting at time T0, as represented at 40. This optical signal is focussed by the transmission optics 2 and travels to the remote object 8 where it is reflected. The receiving optics 3 collects a portion of the reflected optical signal and focuses this energy onto a light sensitive detector 4. This detector converts the collected light signal into an electrical signal which is digitised by the analogue to digital converter 42 and passed to coarse 44 and fine 46 cross-correlation calculation units. The digital to analogue converter sample clock is set equal to the system master clock frequency.

The coarse cross-correlation unit 44 is clocked at the MLS clock frequency Fmls and hence correlates a sub-sampled version of the digitised reflected MLS signal and original stretched MLS transmitted signal. The output from this cross correlation unit is a peak which is detected by pulse detector 48 and which indicates the coarse time delay Tc1 of the reflected signal.

Figure 4:
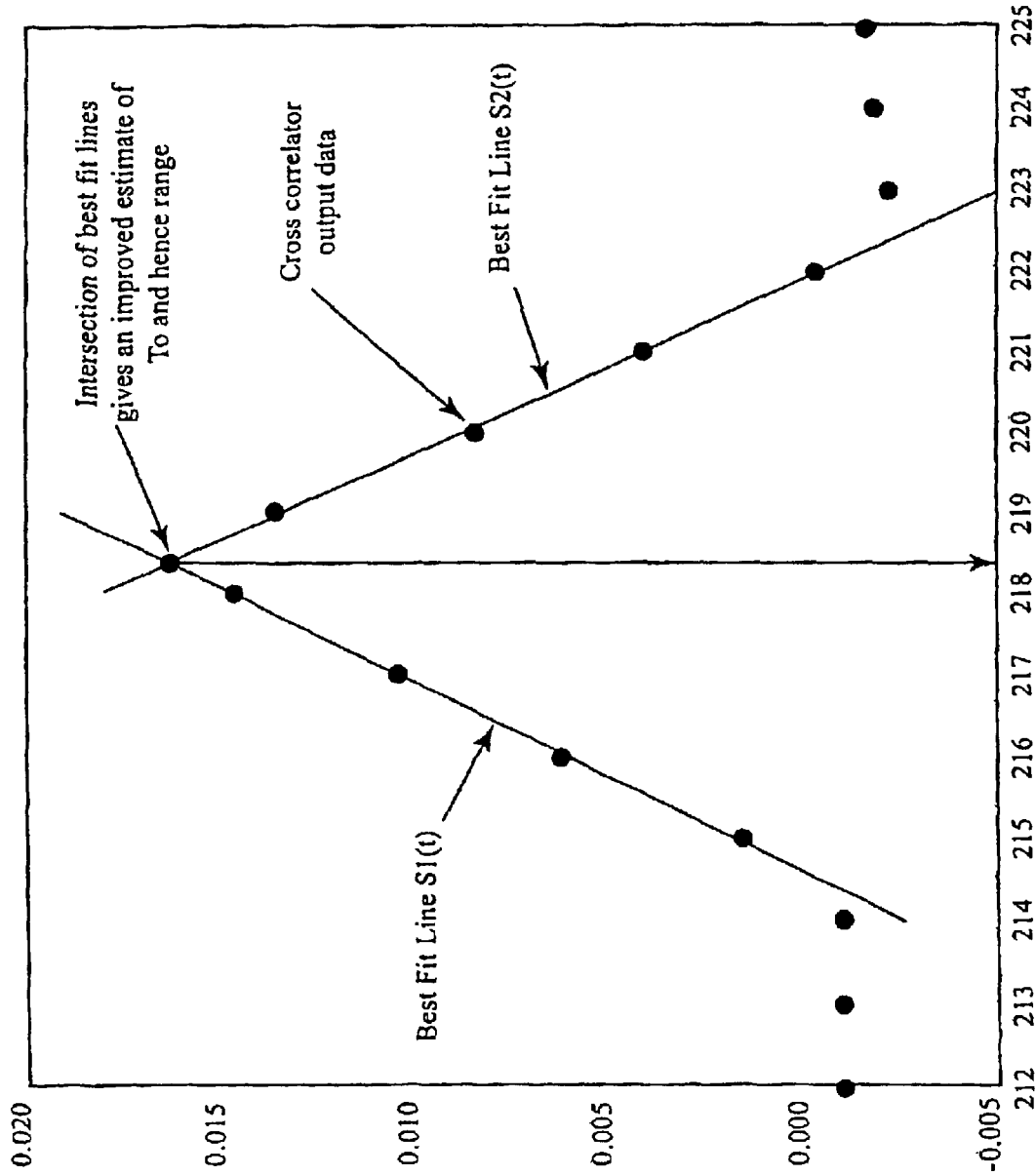
FIG. 4 shows a signal generated by the improved distance measuring equipment in FIG. 3.

The control electronics 50 then causes the fine cross-correlator 46 to calculate the cross-correlation of the transmitted and reflected signals only in the region of time delay Tc1. Typically, the fine cross-correlation function would be calculated for 2M samples before and after Tc1. The output of the fine cross correlator is the cross correlation function of the transmitted and reflected signals in the region of the peak as shown in FIG. 4, where M=4.

Now, it is known that the shape of the correlation peak for a PRBS signal such as an MLS is a triangular pulse. This may be understood by viewing the MLS as the summation of a sequence of N identical pulses, each of width T=1/Fmls and appropriately delayed and summed together. The cross-correlation operation may be viewed as being similar to convolving the MLS with a delayed version of itself and then sampling the result at a frequency equal to the cross correlator clock frequency. Therefore, the shape of the correlation peak output by the cross-correlation unit is given by the convolution function of two identical pulses of width T, which is a triangular pulse of width 2T=2/Fmsl, sampled by the cross correlator clock frequency, which for the fine cross correlator is Fmck=M×Fmls. Hence the cross correlation function output by the fine cross correlator 46 takes the form shown in FIG. 4.

This signal is passed to the timing calculation and control electronics which calculates using known standard techniques the coefficients $m_1$ and $k_1$ for equation of the best fit line through the M samples prior to the peak of the signal:

$$S_1(T) = m_1 \cdot T + k_1$$

and the coefficients $m_2$ and $k_2$ for equation of the best fit line through the M/2 samples after the peak of the signal:

$$S_2(T) = m_2 \cdot T + k_2$$

These lines are shown plotted on FIG. 6. The timing, calculation and display electronics then compute the intersection $T_0$ of the two best fit lines from:

$$T_0 = \frac{(k_2 - k_1)}{(m_1 - m_2)}$$

where $T_0$ is an estimate of the time of the peak of the signal which equates to the time delay between the transmitted and reflected signals.

The distance to the object is then calculated from the determined time $T_0$; it is half the speed of light multiplied by the time taken The considerable benefits of the proposed invention may be seen by comparison with an MLS system just using one correlator. Assume such a system is constructed using an MLS of order 10, a master clock period of 30 nS and a delay step size equal to one fifth of the MLS clock sample frequency. As described above, the total number of calculations required to compute the full cross-correlation for one MLS signal is $1023^2$ or 1046529 operations. Thus to determine the position of the cross correlation peak to within one master clock period (or 5 m) is 1046529 operations. To improve the precision further, and assuming the signal to noise ratio is sufficient, up to five iterations may be required to step the delay to find the precise position of the correlation peak so a worst case total of $5 \times 1023^2 = 5232645$ calculations is required to achieve the best precision, which is one fifth of a master clock cycle=6 nS, giving a best distance precision of 1 m.

Compare the proposed MLS system in FIG. 3 and assume that it operates with the same master clock period, the ratio of master clock frequency to MLS frequency M=8 and that the MLS is order 7. This gives a MLS duration of $(2^7-1)=127$ which stretched by the factor M=8 to 1016 master clock cycles (comparable in duration to the system of FIG. 4).

The coarse correlator 44 is clocked at the MLS frequency and hence the total number of calculations required to compute the coarse correlation is $127^2$ or 16129 operations. The fine correlator only needs to compute the convolution peak in the region of the coarse peak. As M=8, we will assume that 16 full length correlation calculations are required so a total of $16 \times 1016 = 16256$ operations are required. At this point, the position of the correlation peak is known to within one master clock cycle but only 16129+16256=32385 operations have been required to find this, rather than $1023^2$ or 1046529 operations for known systems. Thus it can be seen that the use of a stretched MLS has enabled a two step approach to be taken to computing the cross-correlation function of reflected pulse which yields a substantial; in this case 32 fold, reduction in computing requirements allowing the proposed invention to be implemented on much simpler and lower cost hardware.

In addition, the proposed invention uses a prior knowledge of the triangular form of the MLS cross correlation function in combination with the stretched form of the MLS to allow the time $T_0$ of the peak of the cross correlation function to be estimated using the approach described above with a precision better than the duration of one master clock cycle. In practice, for an M=8 system it is found that the position of cross correlation peak can be estimated to better than one quarter of the master clock cycle giving a distance precision very similar to the known system, but without the need for transmitting additional MLS cycles.

Figure 5:
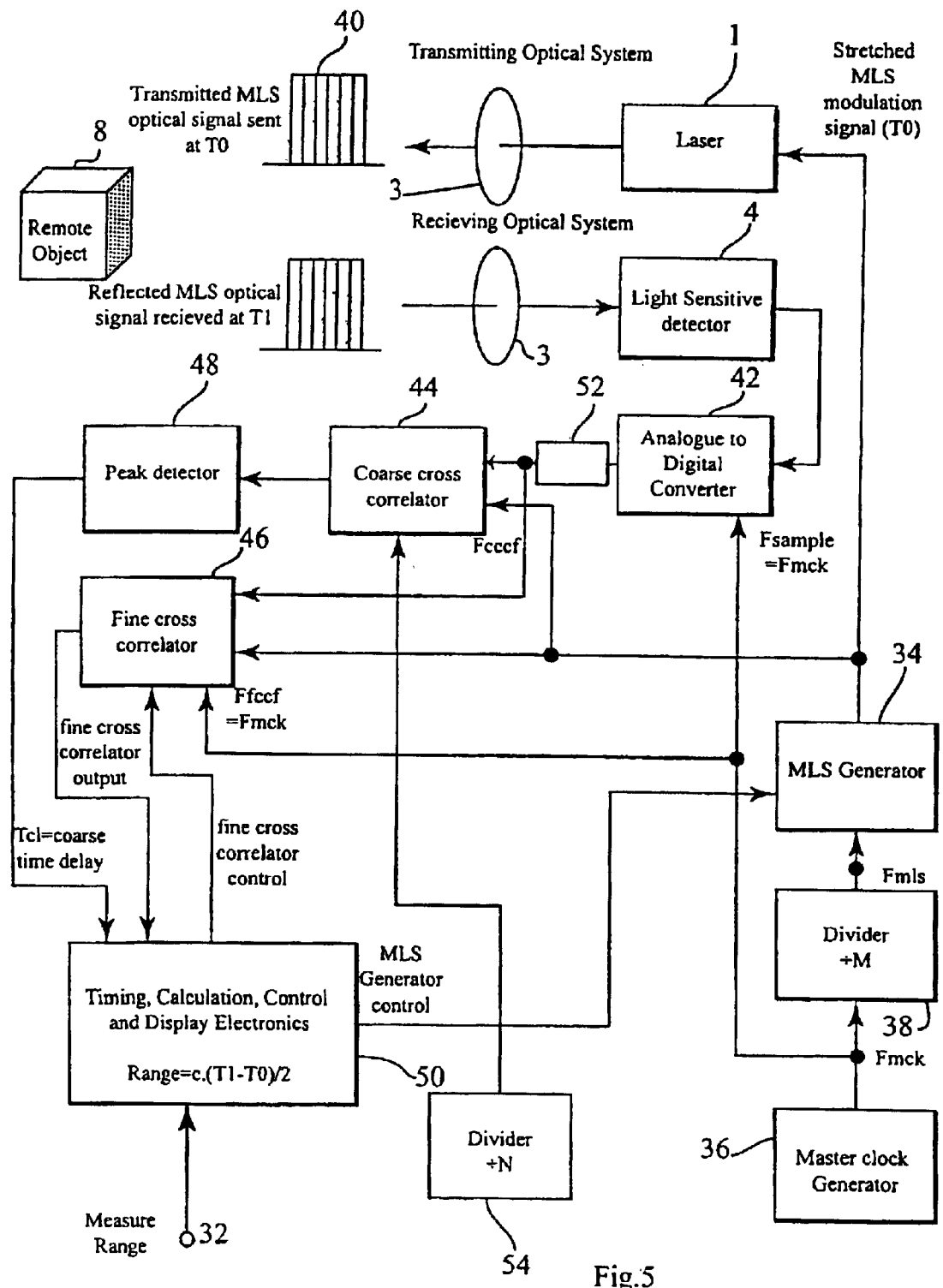
FIG. 5 shows a schematic diagram of a second embodiment of the invention.

FIG. 5 shows a second embodiment of the invention wherein a memory 52 is provided on the output of the analogue to digital converter. Where the signal to noise ratio is poor multiple stretched MLS signals can be sent and the received signals averaged in memory 52 prior to carrying out the coarse and fine cross-correlation calculations. As detector and ambient noise is uncorrelated, this improves the signal to noise ratio of the digitised signal and enables the maximum range and precision of the system to be improved.

In this embodiment the coarse cross-correlation unit subsamples the received and stretched MLS signals at a different frequency to the MLS clock signal. In this case the coarse cross-correlator is clocked at a frequency FCcc which is a different sub-multiple N of the master clock signal, obtained by divider 54. This can be advantageous in improving the detection of the coarse position of the cross correlation function when the signal to noise ratio is poor. In addition, the coarse cross-correlation unit may be preceded by a low pass filter to further improve the detection of the coarse position of the cross correlation function when the signal to noise ratio is poor. For example, the low pass filter may be implemented very simply by adding together N successive samples of the received signal.

It can be seen that many different combinations of the ratios of master clock frequency to MLS clock frequency (M=Fc/Fmls) and master clock frequency to coarse cross-correlation clock frequency (N=Fc/Fcc) are possible to yield different levels of improvement in range, precision and computation time and these combinations may be selected adaptively to optimise the performance of the LRF for different measurement conditions.

The coarse correlator periodically calculates the signal stored in the memory 52 until it detects that the signal to noise ratio is sufficient for a fine measurement to be made. Then, a fine measurement is made by the fine cross-correlation unit The invention enables improvement in the performance of optical distance measuring equipment which operates on the principle of measuring the time of flight of an optical signal from the observer to a distant object and back.

What is claimed is:

1. Optical distance measuring equipment comprising
   a signal source for supplying a modulation signal,
   a transmission system connected to the signal source for transmitting a transmitted optical signal modulated by the modulation signal,
   a reception system for receiving a received optical signal which is a reflected and delayed version of the transmitted signal,
   and a cross-correlator arranged to carry out the steps of
      determining, at a coarse resolution, a time delay of the modulation signal needed to maximise the cross correlation between the time delayed modulation signal and the received signal,
      determining at a finer resolution than the coarse resolution, a time delay of the modulation signal needed to maximise the cross correlation between the modulation signal and the received signal as a function of the time delay of the modulation signal with respect to the received signal in a time delay range around the time delay determined at a coarse resolution, and
      outputting a measure of distance calculated from the time delay of the modulation signal determined at a finer resolution.

2. Optical distance measuring system according to claim 1 wherein the cross-correlator comprises
   a coarse cross-correlator for coarsely determining the time delay of the modulation signal needed to maximise the correlation between the time delayed modulation signal and the received signal, and a fine cross-correlator for calculating the correlation between the modulation signal and the received signal as a function of the time delay of the modulation signal with respect to the received signal in a time delay range around the time shift determined by the coarse cross-correlator.

3. Optical distance measuring equipment according to claim 2 wherein the coarse cross correlator is clocked at a first frequency and the fine cross-correlator is clocked at a higher second frequency.

4. Optical distance measuring equipment according to claim 3 wherein the signal source is clocked at a sub-multiple of the second clock frequency different to the first clock frequency.

5. Optical distance measuring equipment according to any preceding claim arranged to periodically calculate the time delay at the coarse resolution until a predetermined signal to noise ratio is achieved and then to trigger the determination of correlation at the finer resolution.

6. Optical distance measuring equipment according to any preceding claim wherein the signal source produces a digital modulation signal clocked at a frequency lower than that of a clock input to the cross-correlator.

7. Optical distance measuring equipment according to any preceding claim wherein the digital modulation signal is a maximum length sequence.

8. Optical distance measuring equipment according to any preceding claim further comprising a multiple bit analogue to digital converter for digitising the received signal and outputting a multiple bit output for each clock cycle of the analogue to digital converter.

9. Optical distance measuring equipment according to claim 8 when dependent on claim 3 wherein the analogue to digital converter is clocked at the higher second frequency.

10. Optical distance measuring equipment according to any preceding claim further comprising control electronics for calculating the parameters of a straight line fit to the correlation output by the fine cross-correlator as a function of time delay in the time shift intervals before the peak time shift, for calculating the parameters of a straight line fit to the correlation output by the fine cross-correlator as a function of time delay in the time shift intervals after the peak time shift, and for calculating the peak time shift from the parameters of straight line fits.

11. Optical distance measuring equipment according to any preceding claim further comprising a low pass filter on the input of the coarse cross-correlator.

12. A method of optically measuring distance including supplying a modulation signal, transmitting a transmitted optical signal modulated by the modulation signal, receiving a received optical signal which is a reflected and delayed version of the transmitted signal, coarsely determining a time delay of the modulation signal needed to maximise the cross correlation between the time-delayed modulation signal and the received signal, and calculating at a finer resolution the cross correlation between the modulation signal and the received signal as a function of the time delay of the modulation signal with respect to the received signal in a time delay range around the time delay determined by the coarse cross-correlator to give a measure of distance based on the time delay maximising the cross-correlation calculated at a finer resolution.

13. A method of optically measuring distance according to claim 12 wherein the step of coarsely determining the time delay is carried out at a first clock frequency and the step of calculating the correlation is carried out at a second higher clock frequency.

14. A method of optically measuring distance according to claim 13 wherein the signal source is clocked at a sub-multiple of the second clock frequency different to the first clock frequency.

15. A method of optically measuring distance according to claim 13 wherein the signal source produces a digital modulation signal clocked at the first frequency.

16. A method of optically measuring distance according to any of claims 12 to 15 wherein the digital modulation signal is a maximum length sequence.

17. A method according to any of claims 12 to 16 including periodically taking coarsely determining the time delay until a predetermined signal to noise ratio is achieved, and then taking a measurement at the finer resolution.

18. A method of optically measuring distance according to claim according to any of claims 12 to 17 preceding claim further including digitising the received signal to multiple bit resolution.

19. A method of optically measuring distance according to claim 18 when dependent on claim 13 including clocking the analogue to digital converter at the higher second frequency.

20. A method of optically measuring distance according to any of claims 12 to 19 further comprising calculating the parameters of a straight line fit to the correlation output by the fine cross-correlator as a function of time delay in the time shift intervals before the peak time shift, calculating the parameters of a straight line fit to the correlation output by the fine cross-correlator as a function of time delay in the time shift intervals after the peak time shift, and calculating the peak time shift from the fitted parameters of straight line fits.

21. A method of optically measuring distance according to any of claims 12 to 20 further comprising low pass filtering the input on the coarse cross-correlator.

* * * * *